United States Patent Office
3,576,610
Patented Apr. 27, 1971

3,576,610
THERMOSETTING RESIN-BONDED ABRASIVES CONTAINING CUBIC BORON NITRIDE GRAINS WITH A BOROSILICATE COATING THEREON
Wilfred F. Mathewson, Jr., Franklin, Mich., assignor to General Electric Company
No Drawing. Filed May 15, 1968, Ser. No. 729,457
Int. Cl. B24d 5/02; C08g 51/12
U.S. Cl. 51—295
8 Claims

ABSTRACT OF THE DISCLOSURE

Cubic crystal boron nitride grain is bonded together to form a grinding wheel or other abrasive articles by forming a thin layer of borosilicate on the grain and then bonding the borosilicate-coated grain together with a bonding material. In the preferred embodiment the process comprises first forming a thin deposit of boric oxide on the surface of the cubic crystal boron nitride grain, as by heating and exposing the grain to an oxidizing atmosphere, then applying to the grain an organosilicon compound and heating to cause a reaction between the compound and the boric oxide with resultant formation of a borosilicate, and thereafter bonding the borosilicate-coated grain with an organic resin. By means of the invention, cubic crystal boron nitride abrasive tools with extremely high bond strength can be accomplished.

This invention relates to an improved structure and method for manufacturing bonded cubic crystal boron nitride grain grinding wheels and the like, and more particularly to a structure and method wherein a borosilicate deposit is provided on the cubic crystal boron nitride grain, intermediate the boron nitride and the bonding material, whereby a substantial increase in bond strength is accomplished.

Reference is here made to U.S. Pat. No. 2,947,617, issued Aug. 2, 1960, to Robert H. Wentorf, Jr., and assigned to the assignee of the present invention. This Wentorf patent discloses and covers cubic crystal structure boron nitride having a zinc blende cubic structure and having a hardness approximating that of diamond. Such cubic crystal boron nitride grain is frequently referred to as "borazon."

Because of its extreme hardness, borazon is a superb abrasive grain material for grinding wheels and similar abrasive tools. However, no matter how excellent the grain, the quality of the abrasive tools made by bonding the grains together is largely dependent upon the bond strength accomplished; that is, in order for the excellence of the abrasive grain to manifest itself in the abrasive tool, it is very important that the grain be held firmly in place, and this of course requires high bond strength. Indeed, the harder and therefore more durable the abrasive grain, the greater the demand on high bond strength since when there is extreme hardness the grain has little tendency to fracture or be worn and hence greater tendency to pull free of its bond under severe forces during grinding. Hence, borazon is highly demanding on bond strength between grains if maximum advantage of the hardness is to be accomplished.

It is an object of this invention to provide borazon grain grinding wheels and other abrasive tools having extremely high bond strength. Another and attendant object of the invention is the provision of a method for manufacturing such abrasive tools which results in the excellent bond between the borazon grains. Other objects, features and advantages of the invention will appear more clearly from the following description of the preferred embodiments thereof.

As the first step in the process of this invention, a boric oxide film is formed on the surface of the borazon by exposure of the borazon, preferably in a heated condition, to an oxidizing environment. For example, the barazon grain can be placed in a pre-heated furnace at approximately 775° C. for about ½ hour, the atmosphere in the furnace being ordinary air. This cleans the surface of most impurities and leaves a thin film of boric oxide. Of course there is nothing critical about the precise temperature and period of heating it only being important to provide a thin film of boric oxide.

As the next step, an organosilicon compound is applied to the borazon in a solution that removes the bulk $B_2O_3$, and the borazon with the applied organosilicon compound is heated to cause reaction of the compound with the remaining boric oxide and thereby convert at least a substantial amount of the boric oxide to a borosilicate. The preferred organosilicon compounds for the practice of the invention are the silanes and we have found most preferable the silanes having the formula:

Where N is an amino group or derivative thereof, C is a hydrolyzable group and A and B are either amino groups, hydrolyzable groups, chemically inert groups, or any combination thereof. An example is gamma-aminopropyltriethoxysilane, otherwise referred to as triethoxysilylpropylamine.

The following preferred procedure will illustrate:

The borazon grain with the boric oxide film thereon is refluxed for approximately one hour in a solution of 20% by volume triethoxysilylpropylamine in isopropyl alcohol, filtered and allowed to dry in air for about 12 hours. This results in a partially polymerized layer of the silane, or the product of hydrolysis thereof, over the thin boric oxide film. The coated borazon is then fired at approximately 500° C. for about ½ hour. During such firing the organosilicon reacts with the boric oxide to form a borosilicate, the organosilicon being decomposed during the heating and in the process of such reaction, the organic constituents or the oxidation products thereof being vaporized. It is also possible that a portion of the boron nitride surfaces of the borazon grain enters into the reaction. The borosilicate deposit which results is strongly bonded to the borazon and appears to be chemisorbed to the surface of the borazon through oxygen bonding. It is this strongly bonded borosilicate coating on the borazon grain which gives rise to the excellent bond strengths in abrasive tools made in accordance with the invention.

The above method is ideal for forming the bornsilicate layer on the borazon for various reasons. First, the method utilizes to advantage one of the inherent characteristics of borazon—that of forming a thin oxide layer at its surface when in an oxidizing atmosphere at an elevated temperature. Using this thin boric oxide layer as a reactant with the silica in the applied organosilicon compound, the borosilicate is thereby formed in situ on the borazon grain. This provides optimum bond strength between the borazon and the borosilicate and it also enables accomplishment, in a simple manner, of an extremely thin uniform layer of borosilicate covering all surfaces of the borazon grain. Ideally, the borosilicate layer should be as thin as possible and yet provide a continuous layer.

The organsilicon compounds are ideal for the reason that they provide the silica reactant in an extremely uniform thin deposit preparatory to heating to cause the reaction for the formation of the borosilicate. Also, the silica in the organosilicon compounds is highly reactive upon heat degradation of the compound. Whereas we prefer to use the silanes, it will be understood that other organosilicon compounds can be used and that the choice of solvent for dissolving and applying the compound will be dictated by the solubility characteristics of the particular compound used. The organosilicon compound should, of course, be a solid or hydrolyzable and/or polymerizable to a solid after application thereof to the grain.

After formation of the borosilicate layer on the grain, the grain can be mixed with the bonding material, pressed into grinding wheel or the like, and the bonding material cured or vitrified. Where as vitrified bond is used, the borosilicate layer not only functions to provide good bond strength but also has the advantage of serving as a barrier layer between the vitrifiable frit bonding material and the borazon. This enables wide choice of vitrifiable bonding material since some glass frit ingredients are reactive with boron nitride and, in the absence of the borosilicate layer, would tend to degrade the boroazon during vitrification.

Where an organic resin bond is used, it is desirable to incorporate an intermediate layer of siloxane between the borosilicate layer and the organic resin in order to increase the bond strength between these two materials. The siloxane layer can be applied as follows.

The borosilicate-coated grain is soaked for a short period, about 1 hour being sufficient, in a 20% by volume solution of silane in isopropyl alcohol, filtered and then heated in moist air to 150° C. for about 2 hours. Triethoxysilylpropylamine is excellent as the silane for this step. The silane hydrolyzes and at least partially polymerizes to siloxane and forms an extremely strong bond with the borosilicate substrate layer. The evidence here again is that the hydrolyzed freshly polymerized organosilicon layer is chemisorbed to the borosilicate probably through oxygen bonding.

This coated grain is then mixed with a thermosetting resin, preferably containing a filler, hot-pressed into grinding wheels or the like, and preferably post-cured. Any of a wide variety of thermosetting resins can be used. Phenolformaldehyde is excellent as is epoxy resin. Other thermosetting resins which can be used are, for example, the polyimides, the alkyds, melamine, urea formaldehyde, and the modified resins such as epoxy novalac.

As indicated above, it is generally desirable to use a filler in the thermosetting resin. Typical of the fillers which can be used to advantage are glass fibers, silicon carbide, copper whiskers and hexagonal boron nitride powder. The following specific example will serve to illustrate:

Borazon grain having a grain size of about 60 to 80 mesh and coated with a thin layer of borosilicate and an overlayer of siloxane, as aforesaid, was uniformly mixed with powdered B-stage phenolformaldehyde resin (Bakelite) and silicon carbide (1 to 10 micron particle size) filler in such a proportion as to provide 25% by volume borosilicate coated borazon, 36% by volume silicon carbide filler and 39% by volume phenolformaldehyde resin. This uniform mixture was then hot-pressed at a temperature of about 350° F. and with the pressure of about 2000 pounds per square inch, into grinding wheels. The grinding wheels were then post-cured for about 12 hours and at a temperature of about 375° F. to fully cure the resin.

By means of the invention, improvements in transverse rupture strength of up to 100% and even higher can be accomplished. Such an increase in transverse rupture strength manifests itself in improved grinding efficiencies —improvements as high as 50% and even higher.

It will be understood that while the invention has been described specifically with reference to certain embodiments thereof, various changes and modifications may be made, all within the full and intended scope of the claims which follow.

I claim:
1. An abrasive material comprising cubic crystal boron nitride grains having borosilicate bonded to the surface thereof.
2. An abrasive article comprising borosilicate-coated cubic crystal boron nitride grains in a matrix of resinous bonding material selected from the group consisting of phenolformaldehyde, epoxy, polyimide, alkyd, melamine and urea formaldehyde.
3. A method for surface-coating cubic crystal boron nitride grains comprising the steps of forming a layer of boric oxide on the surface of the boron-nitride grain, applying an organosilicon material to the grain and then heating the grain with an organosilicon material thereon, to react said material with the boric oxide to form a borosilicate layer on said grain.
4. A method as set forth in claim 3 wherein said organosilicon compound is a siloxane which is then hydrolyzed and at least partially polymerized to a siloxane prior to heating said grain.
5. A method for forming an abrasive article comprising the steps of forming borosilicate coating on cubic crystal boron nitride abrasive grains, and thereafter resinous bonding the coated grain together with a bonding material selected from the group consisting of phenolformaldehyde, epoxy, polyimide, alkyd, melamine and urea formaldehyde.
6. A method as set forth in claim 5 wherein said borosilicate coating is formed by applying an organisilicon compound to cubic crystal boron nitride grain having a thin surface layer of boric oxide.
7. A method as set fotrh in claim 5 wherein the borosilicate-coated grain is provided with a thin layer of a siloxane after which the grain is bonded together by a thermosetting organic resin selected from the group consisting of phenolformaldehyde, epoxy, polyimide, alkyd, melamine and urea formaldehyde.
8. A method for forming an abrasive article comprising the steps of forming a thin layer of boric oxide on the surface of cubic crystal boron nitride grains, applying to said grains a thin layer of an organosilicon material, heating said grains to cause a reaction of said material with the boric oxide to form a borosilicate layer on said grain, coating said grains with a siloxane, mixing the grains with a thermosetting organic resin selected from the group consisting of phenolformaldehyde, epoxy, polyimide, alkyd, melamine and urea formaldehyde to form a uniform mixture, pressing said uniform mixture into abrasive articles, and fully curing said resin.

References Cited
UNITED STATES PATENTS

| | | | |
|---|---|---|---|
| 3,098,730 | 7/1963 | Rowse | 51—298 |
| 3,269,815 | 8/1966 | Koophan | 51—308 |
| 3,408,172 | 10/1968 | Wright et al. | 51—298 |
| 3,525,600 | 8/1970 | Yoshikawa et al. | 51—295 |

DONALD J. ARNOLD, Primary Examiner

U.S. Cl. X.R.

51—298, 308; 117—100